(12) United States Patent
Murakami (10) Patent No.: US 10,302,982 B2
(45) Date of Patent: May 28, 2019

(54) DISPLAY APPARATUS (71) Applicant: Sakai Display Products Corporation, Osaka (JP)

(72) Inventor: Yoshihiro Murakami, Osaka (JP)

(73) Assignee: Sakai Display Products Corporation (JP)

( * ) Notice: Subject to any disclaimer, the term of this patent is extended or adjusted under 35 U.S.C. 154(b) by 0 days.

(21) Appl. No.: 15/757,167

(22) PCT Filed: Sep. 3, 2015

(86) PCT No.: PCT/JP2015/075107
§ 371 (c)(1),
(2) Date: Jul. 5, 2018

(87) PCT Pub. No.: WO2017/037923
PCT Pub. Date: Mar. 9, 2017

(65) Prior Publication Data
US 2018/0307086 A1    Oct. 25, 2018

(51) Int. Cl.
*G06F 1/16* (2006.01)
*G02F 1/1333* (2006.01)
*F21V 8/00* (2006.01)
*G02F 1/1335* (2006.01)
(Continued)

(52) U.S. Cl.
CPC ..... *G02F 1/133308* (2013.01); *G02B 6/0055* (2013.01); *G02F 1/1333* (2013.01); *G02F 1/1368* (2013.01); *G02F 1/13452* (2013.01); *G02F 1/133382* (2013.01);
(Continued)

(58) Field of Classification Search
CPC ................. G02B 6/0055; G02F 1/1333; G02F 1/133514; G02F 1/133536; G02F 1/13452
See application file for complete search history.

(56) References Cited

U.S. PATENT DOCUMENTS

2004/0183959 A1* 9/2004 Ishida ................. G02F 1/13452
349/58
2011/0141697 A1* 6/2011 Fujii ................. G02F 1/133308
361/707
(Continued)

FOREIGN PATENT DOCUMENTS

JP      2004286911 A      10/2004
JP      2013205539 A   *  10/2013
(Continued)

*Primary Examiner* — Hoa G Nguyen
*Assistant Examiner* — Keith DePew
(74) *Attorney, Agent, or Firm* — St. Onge Steward Johnston & Reens, LLC (57) ABSTRACT A display device includes a display unit having a display panel, a display unit housing having a boxlike shape and accommodating a part of the display unit, a panel holder holding the display panel and engaged with the display unit housing, a driving circuit board driving the display panel and disposed on an outer surface of a bottom plate of the display unit housing, a connection film connecting the driving circuit board and the display panel, a frame body covering a peripheral portion of the display unit in a front view and a portion of the display unit in a side view, and a rib provided on the panel holder and in contact with a portion, which covers the portion of the display unit, of the frame body.

5 Claims, 8 Drawing Sheets (51) Int. Cl.
*G02F 1/1345* (2006.01)
*G02F 1/1368* (2006.01)

(52) U.S. Cl.
CPC .. *G02F 1/133514* (2013.01); *G02F 1/133536* (2013.01); *G06F 1/1601* (2013.01)

(56) References Cited

U.S. PATENT DOCUMENTS

| | | | |
|---|---|---|---|
| 2014/0307217 A1* | 10/2014 | Nakano | G02F 1/133382 349/161 |
| 2015/0260908 A1 | 9/2015 | Kiguchi | |
| 2015/0316810 A1* | 11/2015 | Shibahara | G02F 1/1333 349/150 |
| 2016/0291397 A1* | 10/2016 | Pyo | G02F 1/133308 |
| 2017/0192285 A1 | 7/2017 | Shibahara | |
| 2017/0325364 A1* | 11/2017 | Jung | H05K 7/20954 |
| 2018/0160573 A1* | 6/2018 | Kim | G02F 1/133382 |
| 2018/0307086 A1* | 10/2018 | Murakami | G02F 1/1333 |

FOREIGN PATENT DOCUMENTS

| | | | |
|---|---|---|---|
| JP | 2013205539 A | 10/2013 | |
| JP | 2014082202 A | 5/2014 | |
| WO | 2014002779 A1 | 1/2014 | |

\* cited by examiner

DISPLAY APPARATUS

FIELD OF THE INVENTION

The present invention relates to a display device including a display unit having a display panel for displaying an image, a display unit housing for accommodating the display unit, and a panel holder holding the display panel and engaged with the display unit housing.

BACKGROUND OF THE INVENTION

A liquid crystal television receiver, as a television receiver, includes a display module, which includes a display panel having a front surface displaying an image, and a backlight unit configured to emit light toward a rear surface of the display panel, and further includes a front cabinet and a rear cabinet for accommodating the display module in such a way as to sandwich the display module.

The display module, if it is an edge-light type, includes a display panel, an optical sheet, a light guiding plate, a reflection sheet, an LED substrate, a light guiding plate holder, a heat spreader, a BL chassis (backlight chassis), and a panel chassis.

The display panel includes a color filter substrate, a liquid crystal layer, a TFT substrate, and a polarizing plate. The color filter substrate and the TFT substrate are mutually bonded via a sealant, so that the liquid crystal layer intervenes therebetween. The BL chassis has a substantially boxlike shape, which is opened toward the display panel. The light guiding plate, the reflection sheet, the LED substrate, the light guiding plate holder, and the heat spreader are accommodated in the BL chassis.

The panel chassis has a frame shape. The display panel is sandwiched between a bezel (or front cabinet) and the panel chassis. The panel chassis is engaged with a side plate of the BL chassis at a lateral surface of the panel chassis. By the configuration described above, the display panel and the backlight unit are integrated. Light emitted from the LED substrate enters, for example, from a long end surface of the light guiding plate and emits from its main surface toward a rear surface of the display panel.

For example, as discussed in JP 2014-082202 A, a driving circuit board (source substrate) is provided along a lower long side of an outer surface of a bottom plate of the BL chassis. The driving circuit board is connected to the display panel in the following manner.

A plurality of connection terminals for source (not illustrated) are formed in a lower long side region of the TFT substrate of the display panel. Connection terminals to be connected to the connection terminals described above are formed in one long side region of a rectangular connection film, such as System On Film (SOF). Both connection terminals are pressure-bonded by using anisotropic conductive film.

A plurality of connection terminals are formed in a lower long side region of the driving circuit board. Connection terminals to be connected to the connection terminals described above are formed in the other long side region of the connection film. Both connection terminals are pressure-bonded by using anisotropic conductive film.

An IC chip for driving a liquid crystal is mounted on a film-like base of the connection film. An outer surface of the connection film is brought into close contact with an inner surface of a metal bezel so that the heat of the IC chip is dissipated.

According to the above-mentioned configuration of the conventional display device, the process of bringing the bezel into contact with the connection film in such a way as to secure the above-mentioned heat dissipation of the IC chip may strongly press the connection film if there is a variation in assembling. In this case, the above-mentioned pressure-bonded portion between the connection terminal of the TFT substrate and the connection terminal of the connection film, or the pressure-bonded portion between the connection terminal of the driving circuit board and the other connection terminal of the connection film, may be subjected to a significant load. As a result, breaking of wire may occur.

SUMMARY OF THE INVENTION

The present invention has been made in view of the above-mentioned circumstances, and an object of the present invention is to provide a display device that can suppress a mechanical load from being applied to a connection portion between the connection film and the display panel, or a connection portion between the connection film and the driving circuit board, while securing heat dissipation of an IC chip or the like mounted on the connection film, and can suppress the occurrence of disconnection.

The display device according to the present invention comprises a display unit having a display panel, a display unit housing having a boxlike shape and accommodating a part of the display unit, a panel holder holding the display panel and engaged with the display unit housing, a driving circuit board driving the display panel and disposed on an outer surface of a bottom plate of the display unit housing, a connection film connecting the driving circuit board and the display panel, a frame body covering a peripheral portion of the display unit in a front view and a portion of the display unit in a side view, and a rib provided on the panel holder and in contact with a portion, which covers the portion of the display unit, of the frame body.

According to an embodiment, a constant clearance can be kept between the panel holder and the frame body, and the force pressing the connection film applied from the frame body can be controlled to be equal to or less than a predetermined value. Accordingly, the load applied to the connection portion between the connection film and the display panel or the connection portion between the connection film and the driving circuit board can be reduced while securing heat dissipation of the IC chip or the like mounted on the connection film, and the occurrence of disconnection can be suppressed.

According to an embodiment of the present invention, the display device further comprises a spacer provided to a portion, which covers the peripheral portion of the display unit and faces the connection film, of the frame body.

According to the embodiment, since the spacer is provided at the above-mentioned portion, the connection film can be forcibly extended without deformation in the region adjacent to the display panel. Accordingly, the load applied to the connection portion between the connection film and the display panel can be further reduced, and the occurrence of disconnection can be suppressed.

According to an embodiment of the present invention, the display device further comprises an engaging portion provided on the outer surface of the display unit housing, wherein the engaging portion engages a distal end portion of the driving circuit board from the connection film.

According to the embodiment, the engaging portion is provided to the display unit housing at a portion opposite to the portion where the driving circuit board is connected to the connection film. Therefore, the engagement is flexible. Accordingly, by engaging the driving circuit board in such a way as to absorb the deformation of the connection film released and extended in the region adjacent to the display panel, the load applied to the connection portion between the connection film and the driving circuit board can be reduced, and the occurrence of disconnection can be suppressed.

According to an embodiment of the display device of the present invention, the engaging portion has a hook shape in a side view and has flexibility, and the driving circuit board is configured in such a way as to slide toward a base portion of the hook-shaped engaging portion and engage with the engaging portion.

According to the embodiment, the driving circuit board can be engaged with the engaging portion after causing the driving circuit board to slide and positioning the driving circuit board at an appropriate position, the load applied to the connection portion between the connection film and the driving circuit board can be adequately reduced, and the occurrence of disconnection can be suppressed. In addition, fixing the driving circuit board to the display unit housing is easy.

According to the display device of the present invention, since the panel holder includes the rib in contact with a portion, which covers the side portion of the display unit, of the frame body, a constant clearance can be kept between the panel holder and the frame body, and the force pressing the connection film applied from the frame body can be controlled to be equal to or less than a predetermined value. Accordingly, the load applied to the connection portion between the connection film and the display panel or the connection portion between the connection film and the driving circuit board can be reduced while securing heat dissipation of the IC chip or the like mounted on the connection film, and the occurrence of disconnection can be suppressed.

DETAILED DESCRIPTION OF THE INVENTION

Hereinafter, the present invention will be described in detail below with reference to attached drawings illustrating some embodiments.

First Embodiment

Figure 1:
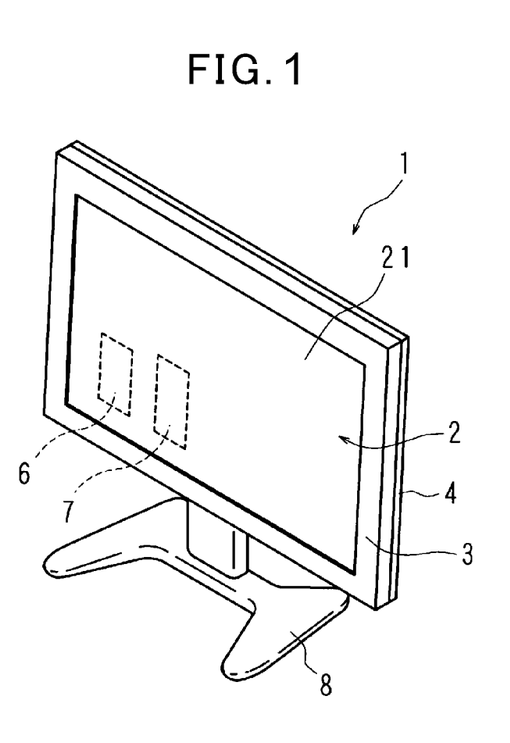
FIG. 1 is a perspective view illustrating a TV receiver according to a first embodiment.
Figure 2:
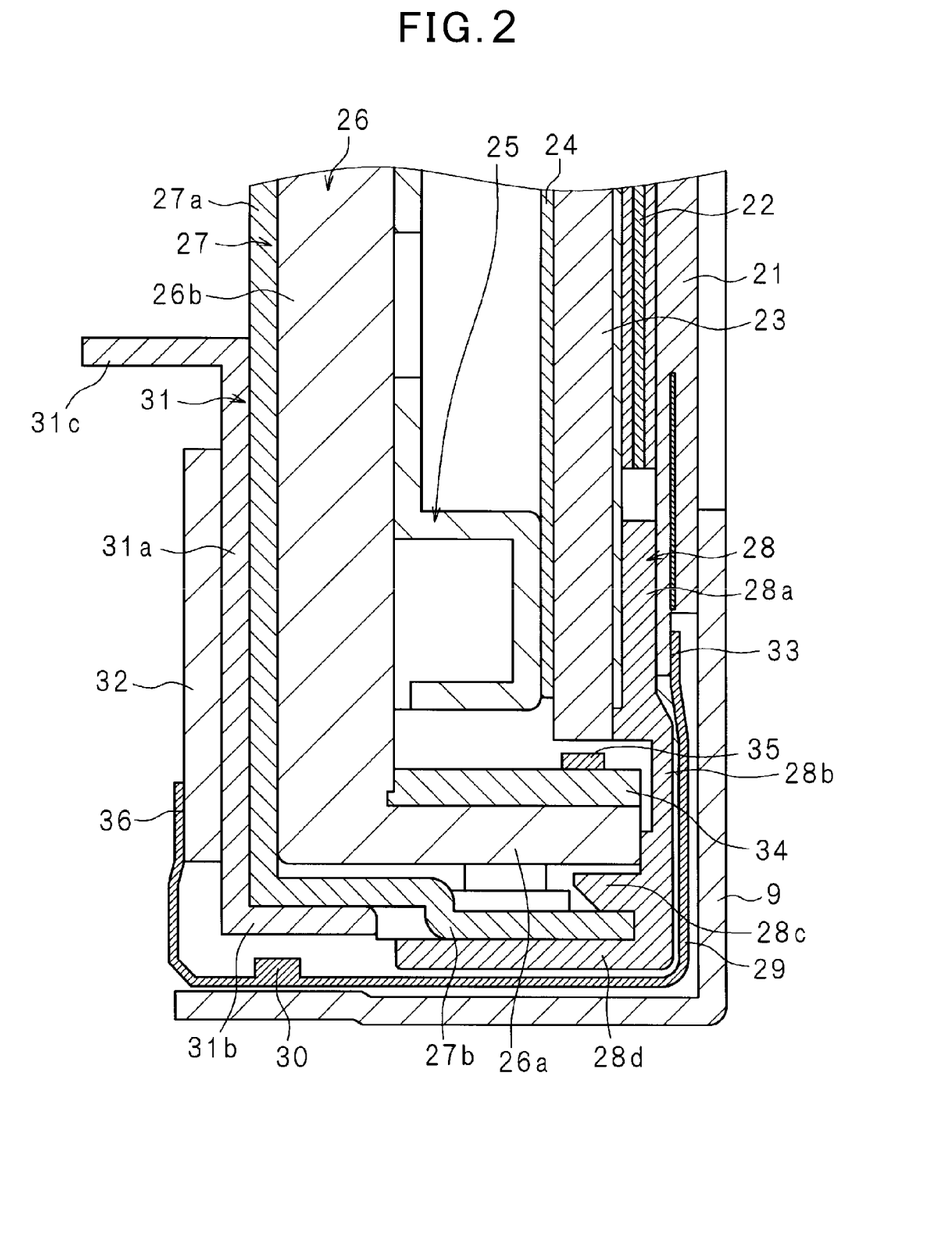
FIG. 2 is a partially vertical cross-sectional view illustrating a display module according to the first embodiment.
Figure 3:
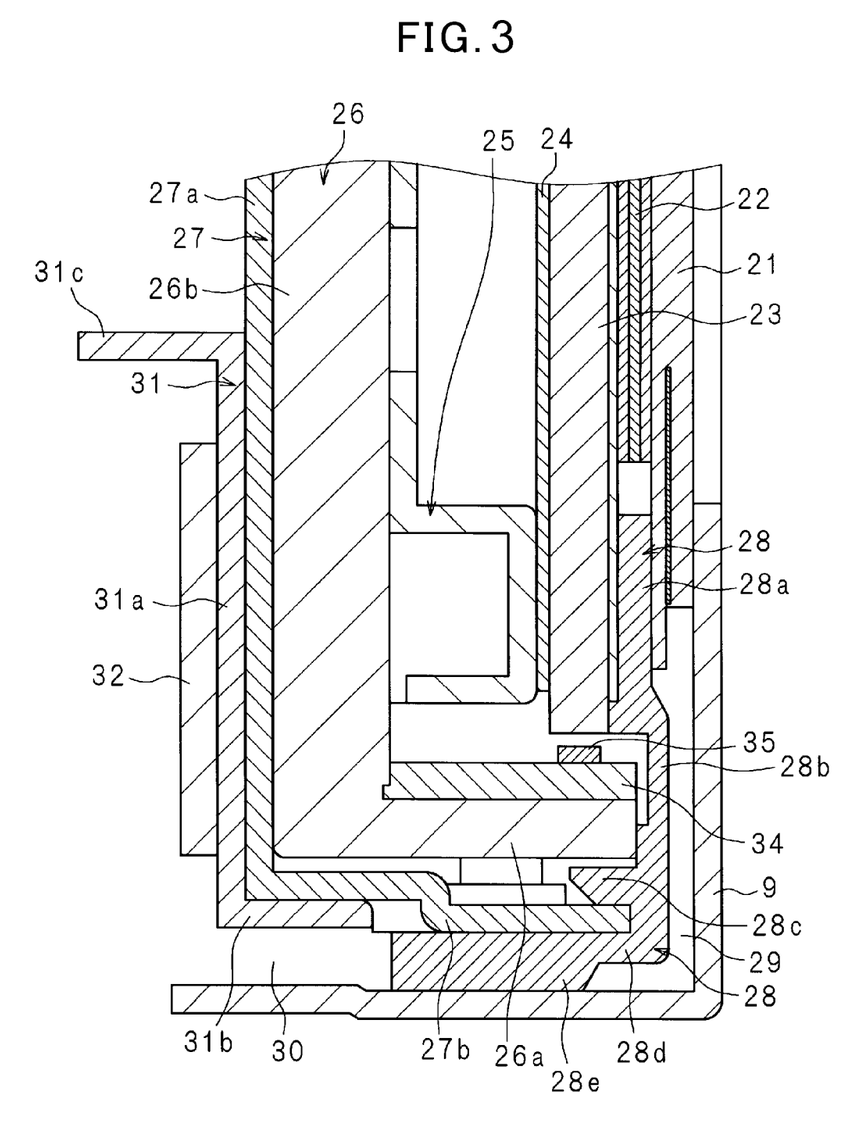
FIG. 3 is a partially vertical cross-sectional view illustrating another state of the display module, taken at a position different from that illustrated in FIG. 2.
Figure 4:
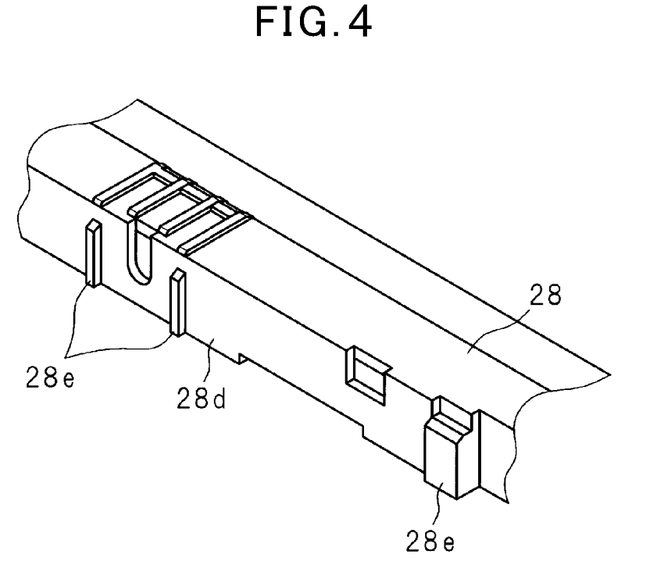
FIG. 4 is a perspective view illustrating a panel chassis.

FIG. 1 is a perspective view illustrating a TV receiver 1 according to a first embodiment of the present invention. FIG. 2 is a partially vertical cross-sectional view illustrating a display module 2. FIG. 3 is a partially vertical cross-sectional view, taken at a position different from that illustrated in FIG. 2. FIG. 4 is a perspective view illustrating a panel chassis 28.

The TV receiver 1 includes the display module 2 having a display panel 21, a front cabinet 3 made of aluminum and a rear cabinet 4 made of synthetic resin, which are disposed in such a way as to sandwich the display module 2 to be accommodated, a tuner 6 receiving broadcast waves via an antenna (not illustrated), a decoder 7 decoding encoded broadcast waves, and a stand 8. The display module 2 has a substantially rectangular parallelepiped shape horizontally extending as a whole and is accommodated in the front cabinet 3 and the rear cabinet 4 in a vertical orientation.

The front cabinet 3 has a rectangular frame shape.
The rear cabinet 4 has a boxlike shape in such a way as to cover a portion (side portion) of the display module 2 in a side view and a portion (rear portion) of the display module 2 in a rear view.

As illustrated in FIG. 2, the display module 2 includes the display panel 21, an optical sheet 22, a light guiding plate 23, a reflection sheet 24, a light guiding plate holder 25, a heat spreader 26, a BL chassis 27, the panel chassis 28, a plurality of connection films 29, a plurality of IC chips 30, a circuit board holder 31, a driving circuit board (source substrate) 32, an LED substrate 34, and a plurality of LEDs 35.

In a display operation, the light guiding plate 23 emits planar light toward a rear surface of the display panel 21.

A bezel 9 having a frame shape covers a peripheral portion of the display module 2 in a front view and a portion (side portion) of the display module 2 in a side view. The bezel 9 is covered by the front cabinet 3.

It should be noted that the front cabinet 3 may be configured to serve as the bezel 9, more specifically, the front cabinet 3 may directly cover the peripheral portion of the display module 2 and side portion of the display module 2.

The BL chassis 27 has a substantially boxlike shape, which is opened toward the display panel 21. The BL chassis 27 accommodates the light guiding plate 23, the reflection sheet 24, the light guiding plate holder 25, the heat spreader 26, the LED substrate 34, and LEDs 35.

The BL chassis 27 has a bottom plate 27a, which mounts the tuner 6, the decoder 7, a main substrate (not illustrated) including a CPU and the like, the driving circuit board 32, and a gate substrate (not illustrated) on an outer surface of the bottom plate 27a.

The display panel 21 includes a color filter substrate, a liquid crystal layer, a TFT substrate, and polarizing plates. The color filter substrate and the TFT substrate are mutually bonded via a sealant, so that the liquid crystal layer intervenes therebetween. The polarizing plates are disposed on a surface, opposite to the liquid crystal layer, of the color filter substrate and a surface, opposite to the liquid crystal layer, of the TFT substrate.

The light guiding plate 23 has a rectangular plate shape. A lower long end surface of the light guiding plate 23 functions as a light incident surface for introducing light into the light guiding plate 23. The light introduced from the long end surface into the light guiding plate 23 is emitted from the main surface of the light guiding plate 23 toward the display panel 21.

The optical sheet 22 includes a plurality of sheets including a diffusion sheet, a lens sheet, and a DBEF sheet (reflective polarizing sheet) and the like. The optical sheet 22 faces the main surface of the light guiding plate 23. The optical sheet 22 diffuses and condenses light emitted from the main surface of the light guiding plate 23.

The LED substrate 34 generates light to be introduced into the light guiding plate 23, and faces the long end surface of the light guiding plate 23. A plurality of LEDs 35 are mounted on a surface of a substrate body of the LED substrate 34.

The heat spreader 26 includes an LED mounting portion 26a to which the LED substrate 34 is attached, and a contact portion 26b being in contact with an inner surface of the bottom plate portion 27a of the BL chassis 27. The heat spreader 26 including the LED mounting portion 26a and the contact portion 26b is formed in L-shape in a side view.

The reflection sheet 24 is disposed on a rear surface of the light guiding plate 23. The light guiding plate holder 25 is disposed between the heat spreader 26 and the reflection sheet 24.

The panel chassis 28 includes a panel supporting portion 28a, a chassis covering portion 28b, a heat spreader supporting portion 28c, and a chassis supporting portion 28d. The panel chassis 28 has a substantially frame shape. The panel supporting portion 28a, the chassis covering portion 28b, and the chassis supporting portion 28d are formed in substantially L shape in a side view.

A cushioning member (not illustrated) interposes between a peripheral portion of a front surface of the display panel 21 and the bezel 9. A cushioning member (not illustrated) interposes between a peripheral portion of a rear surface of the display panel 21 and the panel supporting portion 28a. In this state, the display panel 21 is sandwiched between the bezel 9 and the panel supporting portion 28a.

The chassis covering portion 28b is extended from the panel supporting portion 28a outwardly in a direction along a surface of the display panel. The heat spreader supporting portion 28c is provided in such a way as to protrude orthogonally to the chassis covering portion 28b from a portion adjacent to a lower end of the rear surface of the chassis covering portion 28b, and supports the LED mounting portion 26a of the heat spreader 26. The chassis supporting portion 28d is provided in such a way as to protrude orthogonally to the chassis covering portion 28b from a lower end of the rear surface of the chassis covering portion 28b, and supports a side plate 27b of the BL chassis 27. More specifically, the heat spreader supporting portion 28c and the chassis supporting portion 28d are engaged with the side plate 27b.

The light guiding plate holder 25 interposes between the heat spreader 26 and a set of the reflection sheet 24 and the light guiding plate 23.

The light guiding plate 23 is sandwiched between the light guiding plate holder 25 and a rear surface of the panel supporting portion 28a.

The circuit board holder 31 is provided on an outer surface of the bottom plate 27a of the BL chassis 27, along a lower long side region of the outer surface of the bottom plate 27a.

The circuit board holder 31 includes a circuit board contact portion 31a having a horizontally extending rectangular shape, a chassis supporting portion 31b provided perpendicularly to a lower edge of the circuit board contact portion 31a, and a protruding portion 31c provided perpendicularly to an upper edge of the circuit board contact portion 31a so as to protrude in a direction opposite to the chassis supporting portion 31b.

The driving circuit board 32, having a horizontally extending rectangular plate shape, is in contact with the circuit board contact portion 31a. The chassis supporting portion 31b supports the side plate 27b of the BL chassis 27. The side plate 27b of the BL chassis 27 has a stepped shape, including an upper stepped portion disposed contiguously to the bottom plate 27a and supported by the chassis supporting portion 31b, and a lower stepped portion supported by the above-mentioned chassis supporting portion 28d.

The connection film 29 has a horizontally extending rectangular shape. The connection film 29 includes a film-like base made of a synthetic resin, such as a polyimide-based resin having insulation properties and flexibility, and an IC chip 30 mounted on the base for driving the liquid crystal.

A plurality of connection terminals (not illustrated) are formed in a lower long side region of the TFT substrate of the display panel 21. The connection film 29 has connection terminals to be connected to the connection terminals of the display panel 21. The connection terminals of the connection film 29 are formed in one long side region of the connection film 29. The connection terminals of the display panel 21 and the connection terminals of the connection film 29 are pressure-bonded by using anisotropic conductive film in such a way as to form a pressure-bonded portion 33.

A plurality of connection terminals (not illustrated) are formed in a lower long side region of the driving circuit board 32. The connection film 29 has connection terminals to be connected to the connection terminals of the driving circuit board 32. The connection terminals of the connection film 29 are formed in the other long side region of the connection film 29. The connection terminals of the driving circuit board 32 and the connection terminals of the connection film 29 are pressure-bonded by using anisotropic conductive film in such a way as to form a pressure-bonded portion 36.

In the embodiment, as illustrated in FIGS. 3 and 4, a plurality of ribs 28e protruding downward are provided at a plurality of portions on a lower surface of the chassis supporting portion 28d of the panel chassis 28 so as not to face the connection film 29. Each rib 28e extends along the protruding direction of the chassis supporting portion 28d.

As illustrated in FIG. 4, the width of the rib 28e may be differentiated depending on the installation position.

The rib 28e is in contact with an inner surface of the bezel 9.

As a result, a constant clearance can be kept between the chassis supporting portion 28d of the panel chassis 28 and the bezel 9. The force pressing the connection film 29 applied from the bezel 9 can be controlled to be equal to or less than a predetermined value. Accordingly, the load applied to the pressure-bonded portion 33 between the connection film 29 and the display panel 21 or the pressure-bonded portion 36 between the connection film 29 and the driving circuit board 32 can be reduced while securing heat dissipation of the IC chip 30 mounted on the connection film 29, and the occurrence of disconnection can be suppressed.

Second Embodiment

Figure 5:
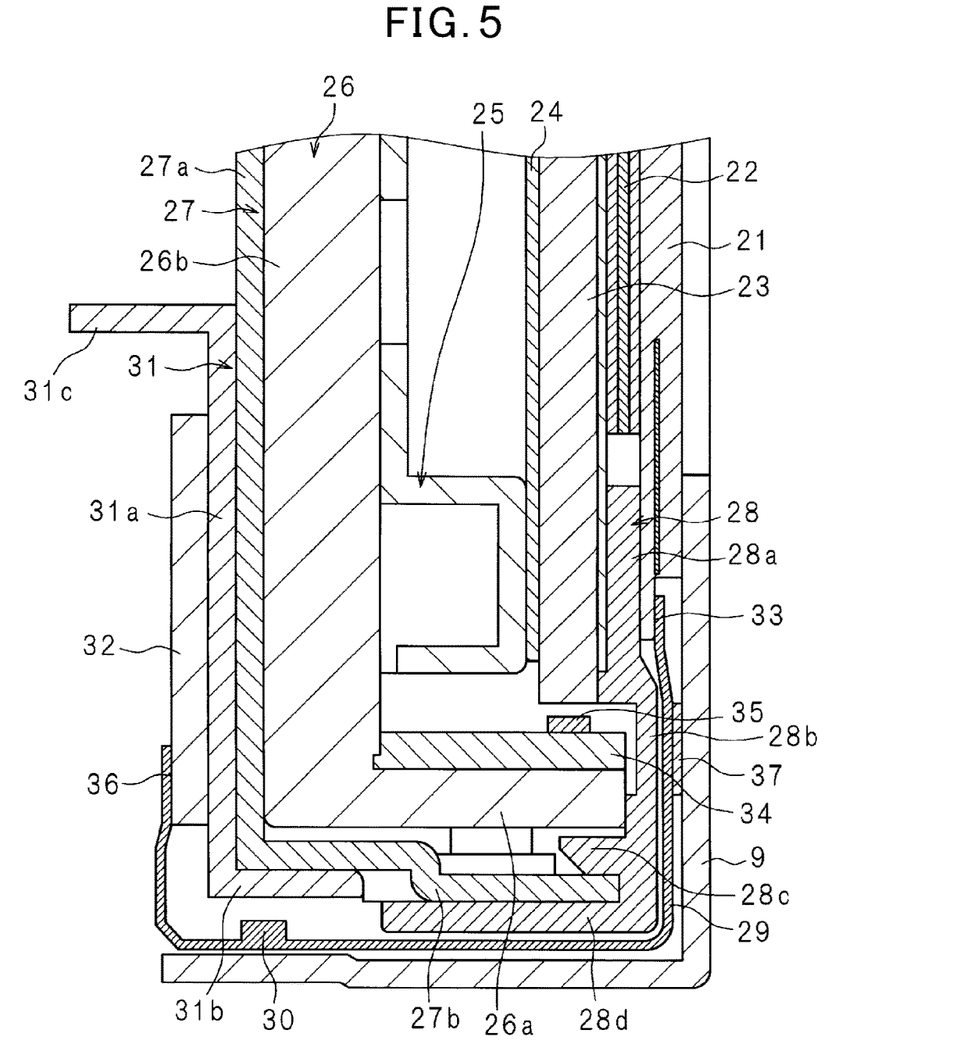
FIG. 5 is a partially vertical cross-sectional view illustrating a display module according to a second embodiment.

A display module 2 according to a second embodiment is similar in configuration to the display module 2 described in the first embodiment, except that a spacer 37 is additionally provided. FIG. 5 is a vertical cross-sectional view illustrating the display module 2 according to the second embodiment. In the drawings, portions similar to those illustrated in FIG. 2 are denoted by the same reference numerals and not described in detail below.

In the embodiment, the spacer 37 is provided on the rear surface of the bezel 9, at a portion facing the connection film 29 and adjacent to the pressure-bonded portion 33.

The spacer 37 forcibly extends the connection film 29 in a region adjacent to the display panel straight toward downward without deformation.

Accordingly, the load applied to the pressure-bonded portion 33 due to the deformation of the connection film 29 in the region adjacent to the display panel can be reduced.

Third Embodiment

Figure 6:
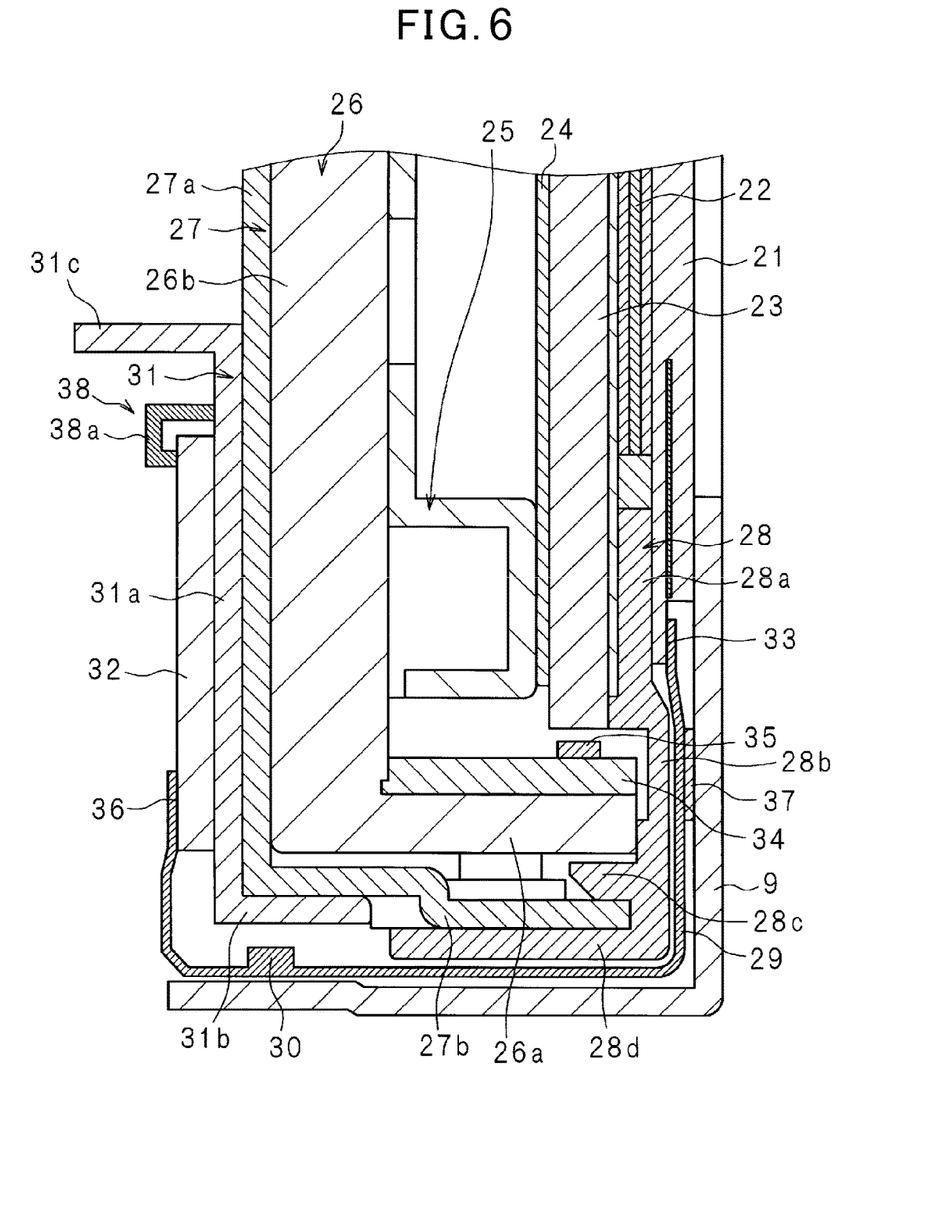
FIG. 6 is a partially vertical cross-sectional view illustrating a display module according to a third embodiment.
Figure 7:
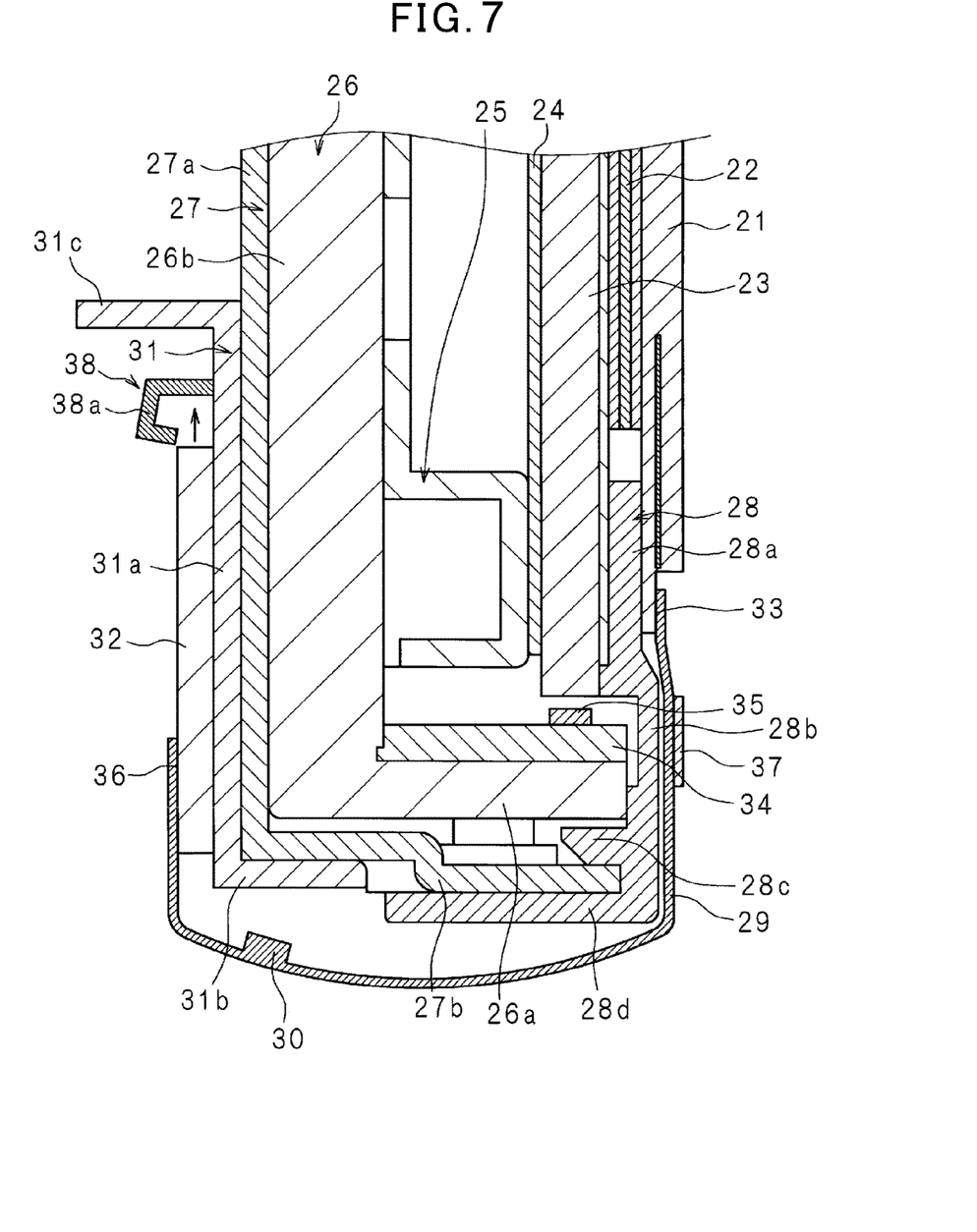
FIG. 7 is a partially vertical cross-sectional view illustrating the display module according to the third embodiment.
Figure 8:
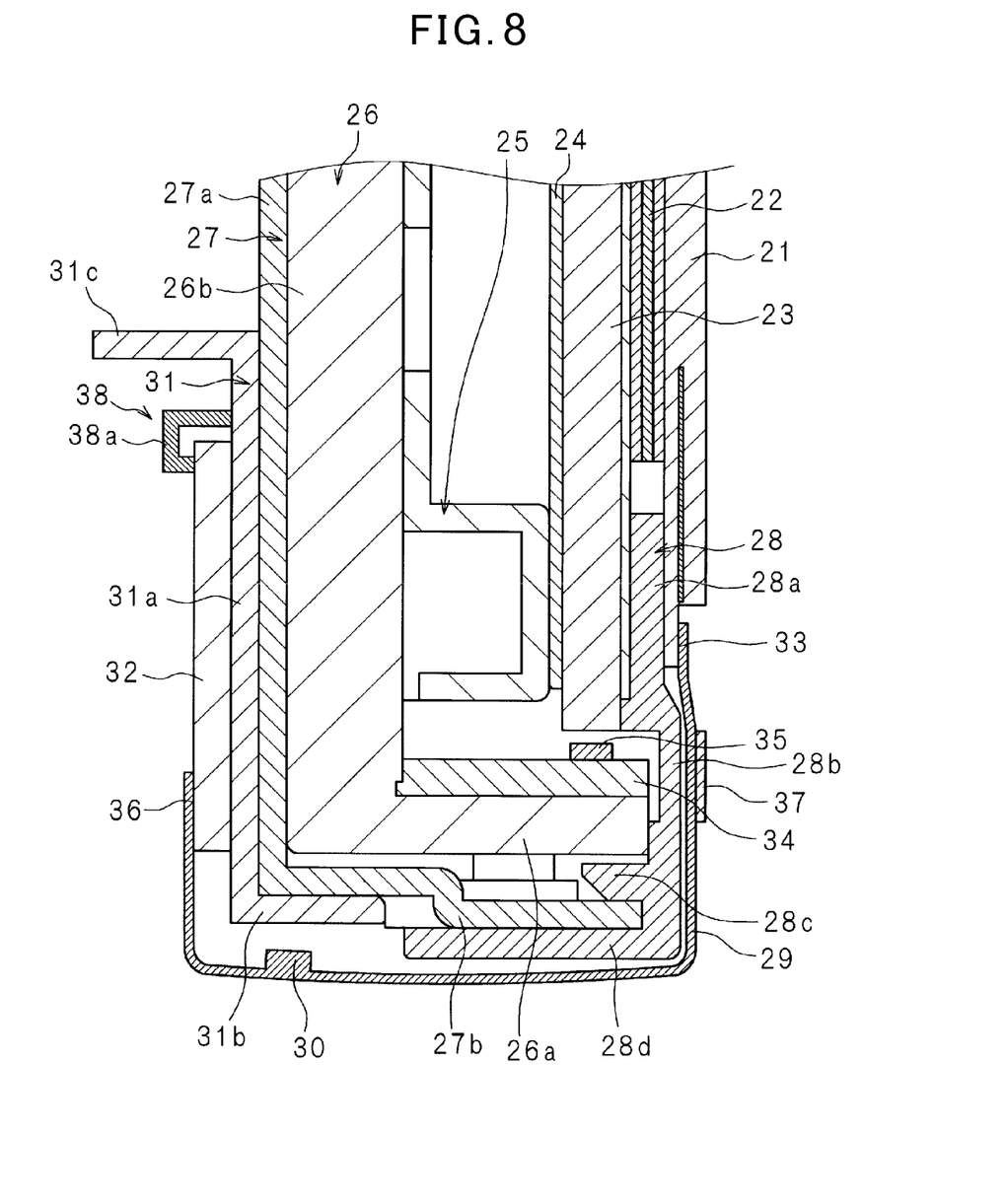
FIG. 8 is a partially vertical cross-sectional view illustrating the display module according to the third embodiment.

A display module 2 according to a third embodiment is similar in configuration to the display module 2 described in the second embodiment, except that an engaging portion 38 is additionally provided. FIG. 6, FIG. 7, and FIG. 8 are partially vertical cross-sectional views illustrating the display module 2 according to the third embodiment. In the drawings, portions similar to those illustrated in FIG. 2 are denoted by the same reference numerals and not described in detail below.

In the present embodiment, the engaging portion 38 is provided on the circuit board contact portion 31a of the circuit board holder 31 in the vicinity of the protruding portion 31c, namely at a portion opposite to the connection portion (pressure-bonded portion 36) between the driving circuit board 32 and the connection film 29.

The engaging portion 38 has a hook shape in a side view, and has a protruding portion 38a at a lower end of the engaging portion 38 for pressing a surface of the driving circuit board 32.

The engaging portion 38 is made of a synthetic resin, such as polyimide-based resin or the like having insulation properties and flexibility. Accordingly, the engaging portion 38 can be opened outward, so that closing the engaging portion 38 after sliding the driving circuit board 32 in the up-and-down direction and positioning the driving circuit board 32 at an appropriate position enables an upper end of the driving circuit board 32 to engage with the engaging portion 38.

The spacer 37 causes the connection film 29 to extend straight toward downward without deformation. As illustrated in FIG. 7, since the deformation can be released toward the pressure-bonded portion 36, the engaging portion 38 can be opened outward in such a way as to absorb wrinkles and the driving circuit board 32 can slide toward a base portion of the engaging portion 38.

As illustrated in FIG. 8, the driving circuit board 32 can be engaged to the engaging portion 38 and fixed to the BL chassis 27, by closing the engaging portion 38 and pressing the driving circuit board 32 toward the bottom plate 27a by the protruding portion 38a, after completing the positioning of the driving circuit board 32 to an appropriate position, more specifically, after extending the connection film 29 straight in the region adjacent to the pressure-bonded portion 36.

As a result, the load applied to the pressure-bonded portion 36 due to the deformation of the connection film 29 in the region adjacent to the driving circuit board 32 can be reduced.

As mentioned above, in the embodiment, the engaging portion 38 is engaging a distal end portion of the driving circuit board 32 from the connection film 29. Therefore, the engagement is flexible. Accordingly, by engaging the driving circuit board 32 in such a way as to absorb the deformation of the connection film 29 released and extended in the region adjacent to the display panel 21, the load applied to the pressure-bonded portion 36 between the connection film 29 and the driving circuit board 32 can be reduced, and the occurrence of disconnection can be suppressed.

In addition, fixing the driving circuit board 32 to the BL chassis 27 is easy.

The present invention is not limited to the contents of the above-mentioned embodiments, and can be modified in various ways within the scope of the claims. More specifically, the technical scope of the present invention encompasses any embodiment obtainable by combining technical means modified appropriately within the scope of the claims.

For example, although the driving circuit board 32 has been described as an exemplary driving circuit board applied in the above-mentioned embodiment, the driving circuit board is not limited to the above-mentioned example. For example, a gate substrate is applicable as the driving circuit board.

Further, the display module 2 is not limited to the edge-light type according to which light is incident from a long end surface of the light guiding plate 23, and may be another type according to which light is incident from a short end surface of the light guiding plate 23, or may be a direct light type.

REFERENCE SIGN LISTS

1 TV receiver
2 display module
3 front cabinet
4 rear cabinet
9 bezel
21 display panel
22 optical sheet
23 light guiding plate
24 reflection sheet
25 light guiding plate holder
26 heat spreader
27 BL chassis
27a bottom plate
27b side plate
28 panel chassis
28e rib
29 connection film
30 IC chip
31 circuit board holder
32 driving circuit board
33, 36 pressure-bonded portion
34 LED substrate
35 LED
37 spacer
38 engaging portion
38a protruding portion

The invention claimed is:
1. A display device comprising:
a display unit having:
a display panel having a front surface displaying an image and a rear surface opposite to the front surface;
a panel holder having a first supporting portion holding the rear surface of the display panel,
a display unit housing engaged with the panel holder and accommodating a part of the display unit, the display unit housing having a boxlike shape and including a bottom plate and a side plate extending from the bottom plate toward frontward, a driving circuit board driving the display panel and disposed rearward of the bottom plate of the display unit housing, and a connection film connecting the driving circuit board and the display panel; and a frame body having a first portion covering a peripheral portion of the display unit in a front view and a second portion covering a portion of the display unit in a side view; wherein the panel holder has a rib in contact with the second portion of the frame body;

the display unit has an engaging portion protruding rearward from a rear portion of the display unit, the engaging portion engaging a distal end portion of the driving circuit board from the connection film;

the engaging portion has a hook shape in a side view and has flexibility; and the driving circuit board is configured in such a way as to slide toward a base portion of the hook-shaped engaging portion and engage with the engaging portion;

wherein a circuit board holder is provided on a rear surface of the bottom plate of the display unit housing, the engaging portion is provided on the circuit board holder, and the driving circuit board is slidably disposed on the circuit board holder.

2. The display device according to claim 1, further comprising:

a spacer provided to the first portion of the frame body, the spacer facing the connection film.

3. The display device according to claim 1, wherein the connection film includes an IC chip, and the second portion of the frame body is in contact with the connection film at a region where the IC chip is provided.

4. The display device according to claim 1, wherein the side plate of the display unit housing extends inside the frame body along the second portion of the frame body, the first supporting portion of the panel holder faces the first portion of the frame body in such a way as to sandwich the display panel between the first supporting portion and the first portion of the frame body, and the panel holder has a second supporting portion facing the second portion of the frame body in such a way as to support the side plate of the display unit housing, and the connection film extends from the driving circuit board to the display panel, via a space between the second portion of the frame body and the second supporting portion of the panel holder and a space between the first portion of the frame body and the first supporting portion of the panel holder.

5. The display device according to claim 1, wherein the side plate of the display unit housing extends inside the frame body along the second portion of the frame body, the first supporting portion of the panel holder faces the first portion of the frame body in such a way as to sandwich the display panel between the first supporting portion and the first portion of the frame body, and the panel holder has a second supporting portion facing the second portion of the frame body in such a way as to support the side plate of the display unit housing, and the rib extends along a protruding direction of the second supporting portion of the panel holder that protrudes rearward from the first supporting portion.

* * * * *